(12) United States Patent
Sugawara et al.

(10) Patent No.: US 6,431,727 B1
(45) Date of Patent: Aug. 13, 2002

(54) ILLUMINATION DEVICE FOR SELECTIVELY COMPRESSING LIGHT FROM LIGHT SOURCES AND PROJECTION TYPE DISPLAY APPARATUS

(75) Inventors: Saburo Sugawara, Kawasaki; Atsushi Okuyama, Tokorozawa, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,392

(22) Filed: Oct. 29, 1999

(30) Foreign Application Priority Data

Oct. 29, 1998 (JP) ............................................. 10-322964

(51) Int. Cl.[7] ............................. F21V 5/00; G02B 27/10
(52) U.S. Cl. ...................... 362/244; 362/268; 362/332; 359/622; 359/618
(58) Field of Search ........................... 362/244, 268, 362/332; 359/618, 619, 622

(56) References Cited

U.S. PATENT DOCUMENTS

| | | | |
|---|---|---|---|
| 5,765,934 A | 6/1998 | Okamori et al. | 353/94 |
| 5,997,150 A | * 12/1999 | Anderson | 362/227 |
| 6,075,648 A | * 6/2000 | Yamamoto et al. | 359/619 |
| 6,088,170 A | 7/2000 | Lee et al. | 359/710 |
| 6,137,635 A | * 10/2000 | Nakazawa | 359/621 |

FOREIGN PATENT DOCUMENTS

| | | |
|---|---|---|
| DE | 198 02 389 A1 | 8/1998 |
| EP | 0 683 425 A1 | 11/1995 |
| EP | 0 848 274 A1 | 6/1998 |
| JP | 63-132215 | 6/1988 |
| JP | 6-265887 | 9/1994 |
| JP | 10-269816 | 10/1998 |

OTHER PUBLICATIONS

IBM Technical Disclosure Bulletin, vol. 35, No. 3, Aug. 1992, "Uniform Line Illumination With Small Area High Radiant Sources".
European Patent Office Search Report, Mar. 13, 2001.

* cited by examiner

*Primary Examiner*—Sandra O'Shea
*Assistant Examiner*—Ronald E. DelGizzi
(74) *Attorney, Agent, or Firm*—Morgan & Finnegan, LLP

(57) ABSTRACT

This specification discloses an illuminating device in which lights emitted from a plurality of light sources are made into substantially parallel lights and are made to enter a lens array system, and illumination is effected by the lights from the lens array system, characterized in that an optical system in which the action of compressing the incident light in the direction of arrangement of the plurality of light sources is greater than the action of compressing the incident light in a direction perpendicular thereto is provided between the light sources and the lens array system. The specification also discloses a projection type display apparatus including such illuminating device.

42 Claims, 6 Drawing Sheets

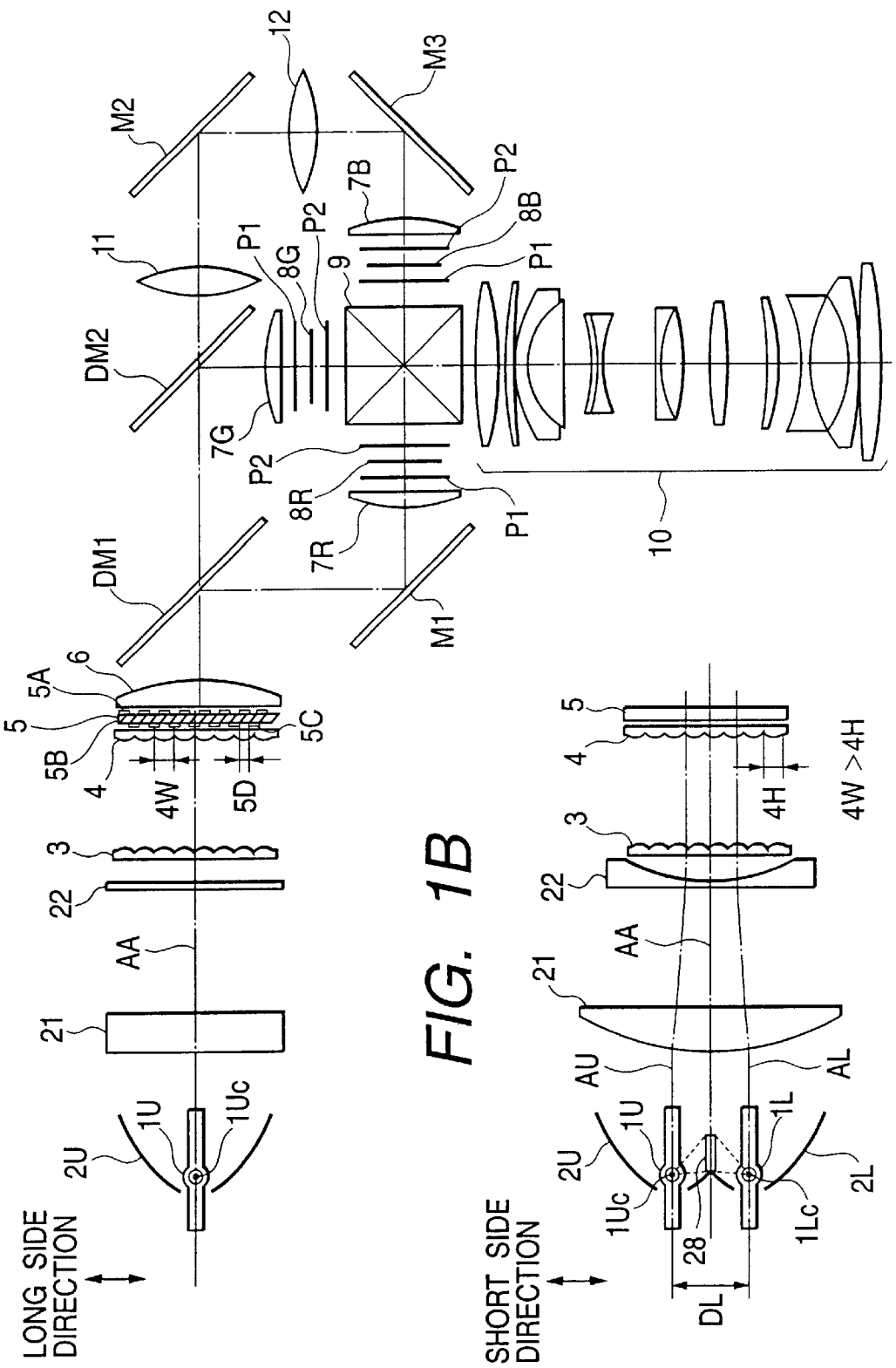

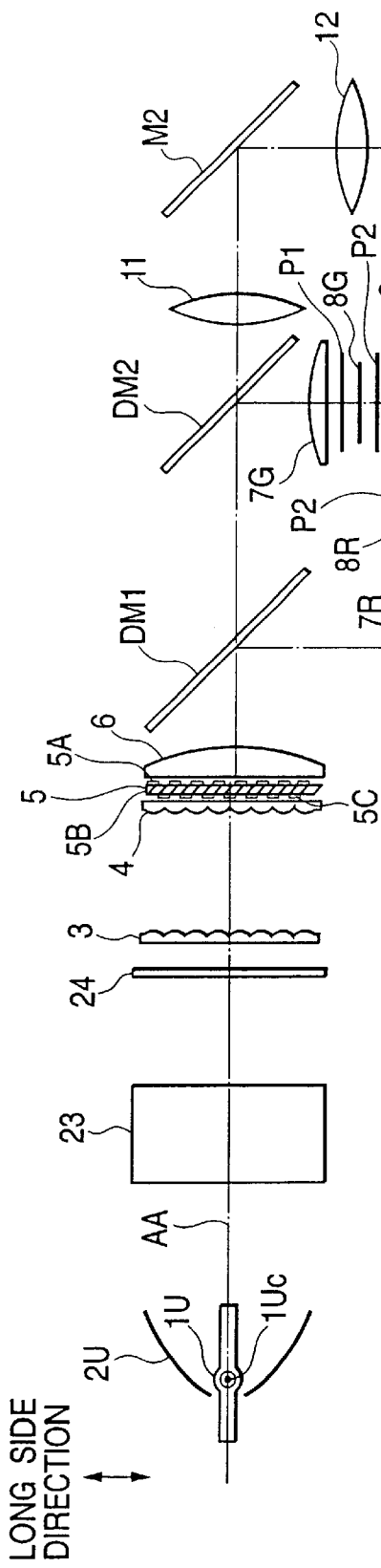
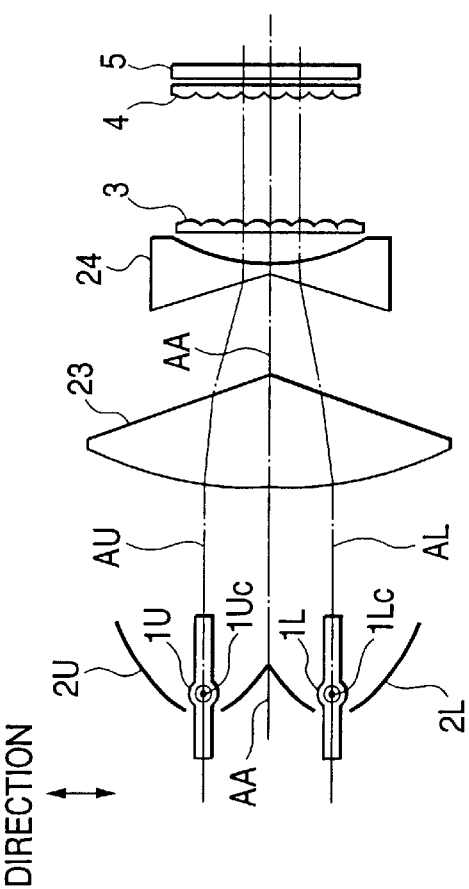
FIG. 2A
FIG. 2B

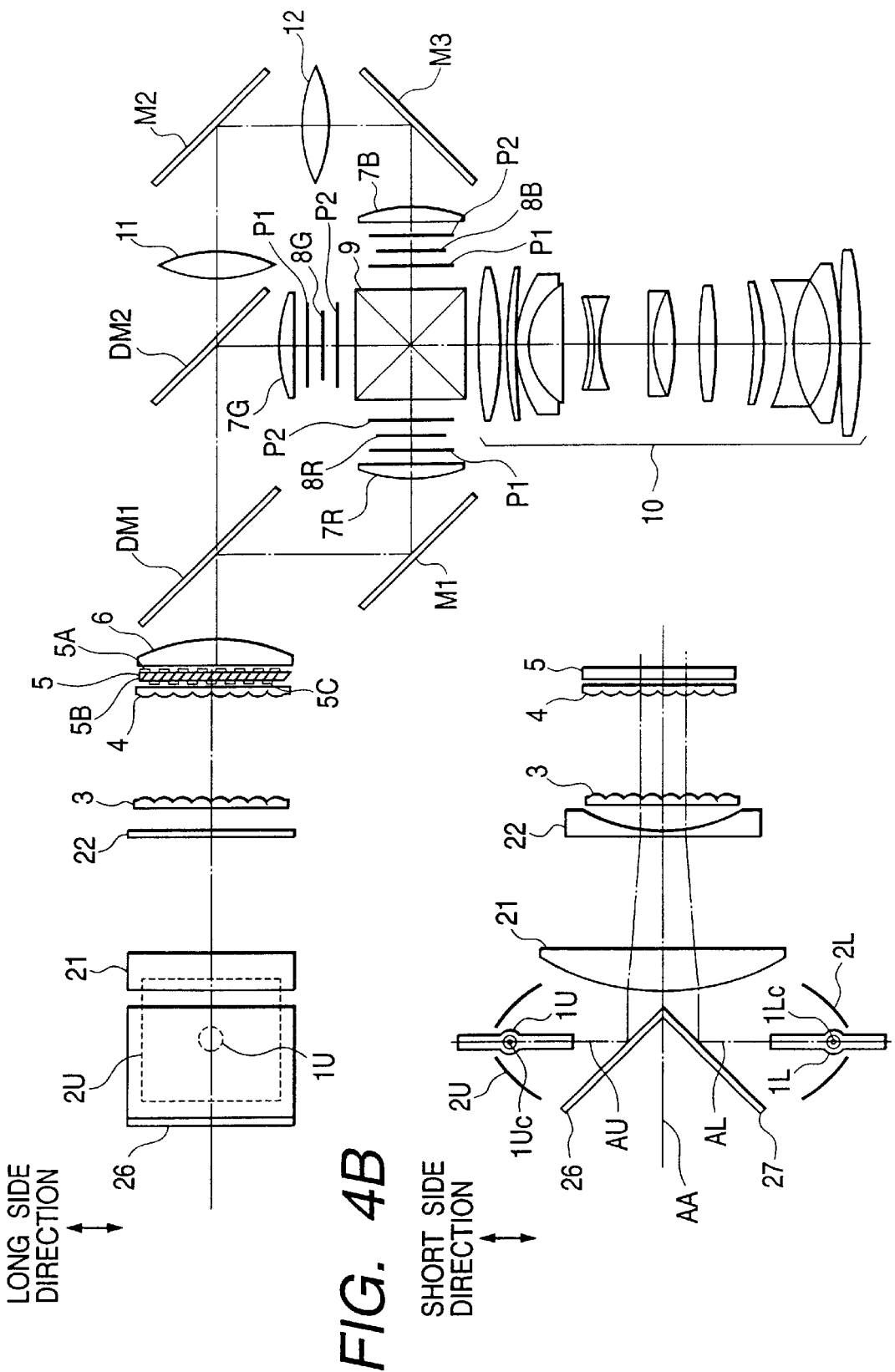
FIG. 4A  LONG SIDE DIRECTION
FIG. 4B  SHORT SIDE DIRECTION

ILLUMINATION DEVICE FOR SELECTIVELY COMPRESSING LIGHT FROM LIGHT SOURCES AND PROJECTION TYPE DISPLAY APPARATUS

BACKGROUND OF THE INVENTION

1. Field of the Invention

This invention relates to an illuminating device and a projection type display apparatus such as a liquid crystal projector using the same.

2. Related Background Art

Heretofore, as the illuminating device of a projection type display apparatus, one as shown in FIG. 6 of the accompanying drawings which comprises a combination of a light-emitting tube 1 and a parabolic mirror 19 has been popular.

In FIG. 6, white light emitted from the light-emitting portion 1c of the light-emitting tube 1 (light source) is converted into a substantially parallel light by the parabolic mirror 19, and the light source image of the light-emitting tube 1 is formed at the center of each frame of a second lens array 4 by a first lens array 3. The focal lengths of the first lens array 3 and the second lens array 4 are substantially equal to each other, and the spacing between the first lens array 3 and the second lens array 4 is a spacing substantially equal to the focal length of the first lens array 3.

The light beam condensed by the first lens array 3 is separated into a P wave and an S wave by the polarization separating layer 5B of a polarization converting element 5, and the S wave is reflected by the polarization separating layer 5B, and is further reflected by an adjacent polarization separating layer 5B, whereby it emerges from the gap of a $\lambda/2$ phase difference plate 5A disposed like a bamboo-blind at the emergence side of the polarization converting element 5. The P wave is transmitted through the polarization separating layer 5B and is further transmitted through the $\lambda/2$ phase difference plate 5A, whereby it is phase-converted and emerges with the direction of its polarization axis uniformized to the S wave. Thereby the light beam emerging from the polarization converting element 5 all become polarized lights (S waves) having polarization axes in the same direction. The reference character 5C designates a bamboo-blind-like light-intercepting plate.

The light beam emerging from the polarization converting element 5 is deflected by a first condenser lens 6, and is modulated into R, G and B colors, which are superposed on the display portions 8R, 8G and 8B of an image modulating device comprising a liquid crystal panel. That is, of the light beam emerging from the first condenser lens 6, red light is reflected by a dichroic mirror DM1 and the remaining green light and blue light are transmitted therethrough. The red light reflected by the dichroic mirror DM1 is directed to the display portion 8R of an image modulating device for red through the intermediary of a reflecting mirror M1 and a second condenser lens 7R. The light transmitted through the dichroic mirror DM1 is separated into green and blue by a dichroic mirror DM2. The green light is reflected by the dichroic mirror DM2, and is directed to the display portion 8G of an image modulating device for green through a second condenser lens 7G. The blue light transmitted through the dichroic mirror DM2 is condensed by a third condenser lens 11, is reflected by a reflecting mirror M2, and is directed to the display portion 8B of an image modulating device for blue by a relay lens 12 through the intermediary of a reflecting mirror M3 and a second condenser lens 7B.

In FIG. 6, the reference character P1 designates an incidence side polarizing plate, and the reference character P2 denotes an emergence side polarizing plate. The second condenser lenses 7R, 7G and 7B are for condensing the light beam emerging from the first condenser lens 6 onto the entrance pupil of a projection lens 10. A cross dichroic prism 9 is disposed between the display portions 8R, 8G, 8B of the image modulating devices and a projection lens 10 to effect color combination. The projection lens 10 is designed to be telecentric relative to the display portions 8R, 8G and 8B of the image modulating devices, and is designed such that the angle of incidence on the dichroic film surface of the cross dichroic prism 9 is constant everywhere on the dichroic film, and is designed such that the color irregularity by any change in the angle of incidence of the dichroic film does not occur. The light beams modulated by the display portions 8R, 8G and 8B of the image modulating devices are color-combined by the cross dichroic prism 9, and are enlargedly projected onto a screen, not shown, by the projection lens 10.

Also, a projection type display apparatus using a light source device including a combination of a plurality of light sources, a plurality of reflecting mirrors and a pair of lens arrays to increase the brightness of an image on the screen is proposed in Japanese Laid-Open Patent Application No. 6-265887, and it is conceived to use such a light source device in the liquid crystal projector of FIG. 6.

If two light sources and a reflecting mirror for disposing the two light sources at a focal position are simply arranged in front of a first lens array 3, unless the focal length of the reflecting mirror is greatly shortened, a desired angle for introducing the lights emitted from the light sources is not obtained, and consequently the degree of parallelism of the light beams entering the first lens array 3 is aggravated, and when the light source portion of the aforementioned Japanese Laid-Open Patent Application No. 6-265887 is used as the light source portion of FIG. 6, the eclipse at the light intercepting portion 5C of a polarization converting element 5 increases and the illumination efficiency becomes reduced. Therefore, it has been found that in spite of the two light sources being used, the increase in quantity of light is only up to the order of 40% as compared with a case where a light source is used.

SUMMARY OF THE INVENTION

It is the object of the present invention to realize an improvement in the illuminating efficiency when a plurality of light sources are used.

To solve the above-noted problem, in the present invention, in an illuminating device wherein a plurality of light sources are arranged in a direction perpendicular to an optical axis, an illuminating optical system for illuminating a surface to be illuminated with lights from said plurality of light sources, said illuminating optical system including an optical system in which an action of compressing the lights in a direction of arrangement of said plurality of light sources is stronger than an action of compressing the lights in a direction perpendicular to the direction of arrangement of said plurality of light sources. The illuminating device of the present invention is an illuminating device wherein lights emitted from a plurality of light sources are made to enter a lens array system and illumination is effected by the lights from this lens array system, an optical system in which the action of compressing the lights in the direction of arrangement of the plurality of light sources is greater than the action of compressing the lights in a direction perpendicular thereto is provided between the plurality of light sources and the lens array system. The lens array system is provided with at least one fly-eye lens or at least one lenticular lens.

The illuminating device of the present invention is an illuminating device in which lights emitted from a plurality of light sources are substantially parallel lights and are made to enter a lens array system, and illumination is effected by the lights from the lens array system, characterized in that an optical system in which the action of compressing the incident light in the direction of arrangement of the plurality of light sources is greater than the action of compressing the incident light in a direction perpendicular thereto is provided between the light sources and the lens array system.

In the above-described illuminating device, the plurality of light sources are arranged in the lengthwise direction of a frame of lens constituting the lens array system.

Also, the illuminating device of the present invention is an illuminating device in which lights emitted from a plurality of light sources are substantially parallel lights and are made to enter a lens array system, and illumination is effected by the lights passed from the lens array system through a polarization converting element, characterized in that an optical system in which the action of compressing the incident light in the direction of arrangement of the plurality of light sources is greater than the action of compressing the incident light in a direction perpendicular thereto is provided between the light sources and the lens array system.

Also, the illuminating device of the present invention is an illuminating device in which illumination is effected by lights emitted from a plurality of light sources and passed through a polarization converting element, characterized in that the plurality of light sources are arranged in a direction orthogonal to an incidence plane with respect to the light dividing surface of the element.

In the above-described illuminating device, the plurality of light sources are arranged in a direction perpendicular to the lengthwise direction of a frame of lens constituting the lens array system.

In the above-described illuminating device, the lens array system has at least one fly-eye lens or at least one lenticular lens.

Also, the illuminating device of the present invention is an illuminating device characterized by the provision of a plurality of lamps (light sources), a plurality of first optical systems for converting lights emitted from the lamps into substantially parallel lights, a second optical system in which the action of compressing the light beam is the direction of arrangement of the plurality of lamps is greater than the action of compressing the light beam in a direction perpendicular thereto, a third optical system comprised of a lens array having a plurality of lenses, and a fourth optical system comprised of a lens array having a plurality of lenses, the second optical system being disposed between the lamps and the third optical system.

In the above-described illuminating device, the plurality of lamps and first optical systems are arranged in the lengthwise direction of a frame of lens constituting the fourth optical system.

Also, the illuminating device of the present invention is an illuminating device characterized by the provision of a plurality of lamps, a plurality of first optical systems for converting lights emitted from the lamps into substantially parallel lights, a second optical system in which the action of compressing the light beam in the direction of arrangement of the plurality of lamps is greater than the action of compressing the light beam in a direction perpendicular thereto, a third optical system comprised of a lens array having a plurality of lenses, a fourth optical system comprised of a lens array having a plurality of lenses, and a bamboo-blind-like polarization converting element, the second optical system being disposed between the light sources and the third optical system.

In the above-described illuminating device, the plurality of lamps and first optical systems are arranged in a direction perpendicular to the lengthwise direction of a frame of lens constituting the fourth optical system.

The above-described illuminating device further has a fifth optical system having the action of narrowing the optical axis interval of the plurality of first optical systems between the plurality of first optical systems and the second optical system.

In the above-described illuminating device, the centers of openings in the first optical systems and the optical axes of the first optical systems do not coincide with each other.

In the above-described illuminating device, the first optical systems are parabolic mirrors.

In the above-described illuminating device, the following conditional expression is satisfied:

$$3 < DL/Fp < 6,$$

where DL is the interval between the plurality of light sources or lamps, and fp is the second focal length of the parabolic mirrors.

In the above-described illuminating device, the second optical system includes a positive cylindrical lens having positive refractive power in the direction of arrangement of the plurality of lamps arranged in succession from the lamps side, and a negative cylindrical lens having negative refractive power in the direction of arrangement of the plurality of lamps.

In the above-described illuminating device, the positive cylindrical lens is stronger in the refractive power of the light source side lens surface thereof than in that of the other lens surface thereof, and the negative cylindrical lens is stronger in the refractive power of the third optical system side lens surface thereof than in that of the other lens surface thereof.

In the above-described illuminating device, the following conditional expression is satisfied:

$$0.5 < -fs2/fs1 < 0.9,$$

where fs1 is the focal length of the positive cylindrical lens in the direction of arrangement of the plurality of light sources, and fs2 is the focal length of the negative cylindrical lens in the direction of arrangement of the plurality of lamps.

In the above-described illuminating device, a condensing element for rendering the plurality of light sources or lamps conjugate with one another is disposed between adjacent ones of the plurality of light sources.

In the above-described illuminating devices, each of said plurality of light sources includes a lamp unit having a lamp and a parabolic mirror, and the optical axis of each lamp unit is parallel with said optical axis.

Also, the projection type display apparatus of the present invention includes one of the above-described illuminating devices for illuminating an image forming element.

BRIEF DESCRIPTION OF THE DRAWINGS

FIGS. 1A and 1B are optical cross-sectional views of a projection type display apparatus according to a first embodiment of the present invention.

FIGS. 2A and 2B are optical cross-sectional views of a projection type display apparatus according to a second embodiment of the present invention.

FIGS. 4A and 4B are a top plan view and a side view, respectively, of a projection type display apparatus according to a fourth embodiment of the present invention.

DESCRIPTION OF THE PREFERRED EMBODIMENTS

Figures 3A, 3B:
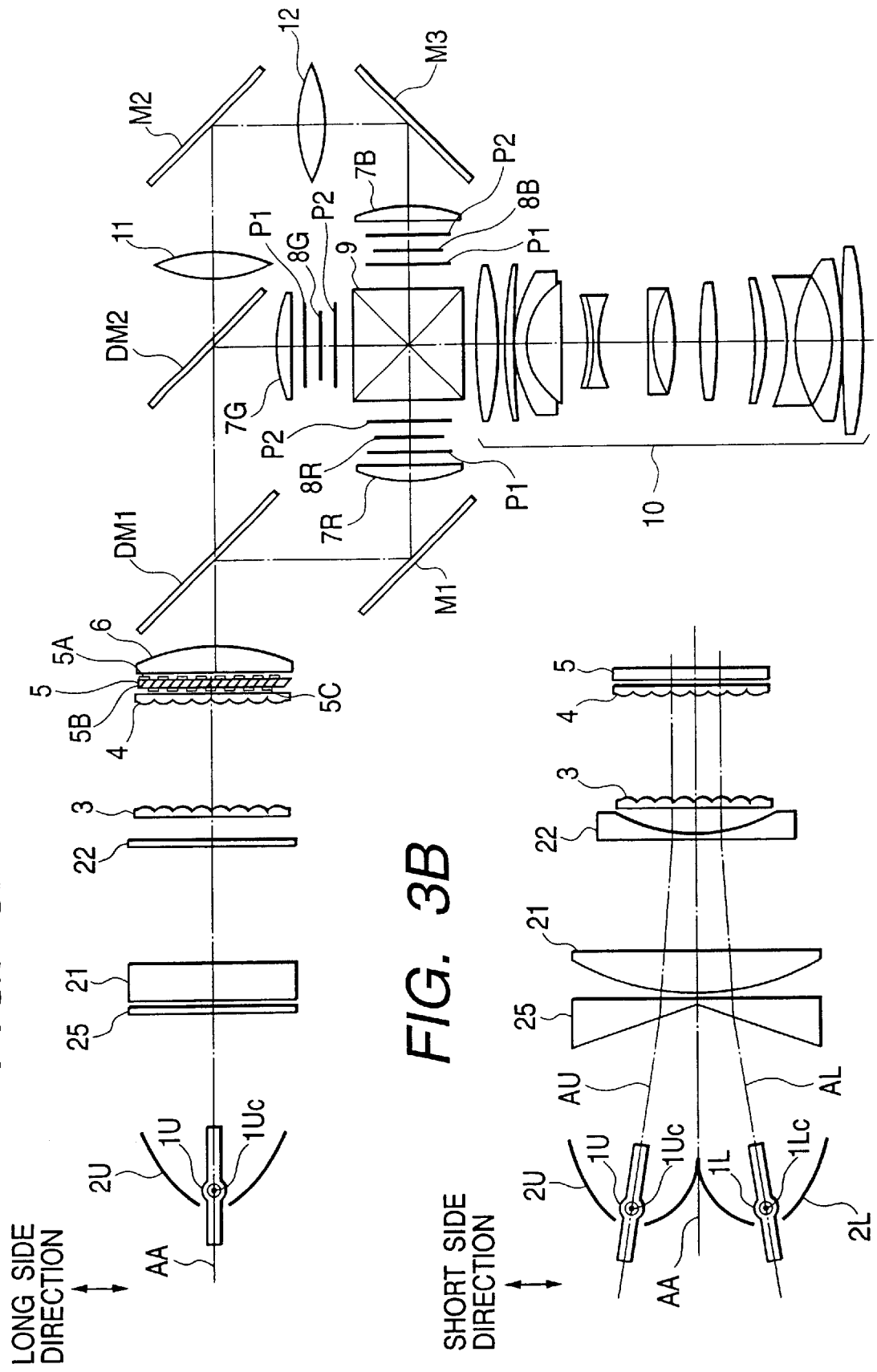
FIGS. 3A and 3B are optical cross-sectional views of a projection type display apparatus according to a third embodiment of the present invention.

Referring to the accompanying drawings, an illuminating device according to the present invention is comprised of at least two light sources 1U and 1L, a plurality of first optical systems 2U and 2L for converting lights emitted from the two light sources into substantially parallel lights, second optical systems 21 and 22 in which the action of compressing the light beam in the direction of arrangement of the plurality of light sources is greater than the action of compressing the light beam in a direction perpendicular thereto, a third optical system 3 comprised of a lens array having a plurality of lenses, and a fourth optical system 4 comprised of a lens array having a plurality of lenses, and is characterized in that the second optical systems are disposed between the light sources and the third optical system. It is also characterized in that as required, a bamboo-blind-like polarization converting element 5 is disposed at the emergence side of the fourth optical system 4. In this case, it is preferable that the plurality of light sources 1U and 1L be arranged in a direction (direction 4H) in which the width of a frame of lens of the fourth optical system 4 is narrow. When the bamboo-blind-like polarization converting element is not used, it is preferable that the plurality of light sources be arranged in a direction (direction 4W) in which the width of a frame of lens of the fourth optical system is wide.

Further, the illuminating device is characterized in that the centers of openings in the first optical systems 2U and 2L and the optical axes AU and AL of the first optical systems do not coincide with each other.

Also, the illuminating device is characterized by fifth optical systems 25, 26, 27, 29 and 30 having the action of narrowing the optical axis interval between the plurality of first optical systems provided between the plurality of first optical systems 2U, 2L and the second optical systems 21, 22.

The illuminating device is further characterized in that the first optical systems 2U and 2L are parabolic mirrors.

The illuminating device is further characterized in that the following conditional expression is satisfied:

$$3 < DL/fp < 6, \quad (1)$$

when DL is the interval between the plurality of light sources, and fp is the focal length of the parabolic mirrors.

This conditional expression (1) restricts the ratio between the interval DL between the plurality of light sources and the focal length fp of the parabolic mirrors. In the area less than the lower limit value of conditional expression (1), the angle of introduction of the parabolic mirrors for the light of the optical axis AA of an illuminating optical system cannot be secured sufficiently and the illuminating efficiency is reduced. On the other hand, in the area exceeding the upper limit value of conditional expression (1), the portion of high illuminance in the second lens array 4 is distributed greatly separately from the optical axis of the illuminating system and therefore, the eclipse in a projection lens 10 becomes great, and this is not good. Also, when a microlens is used in a liquid crystal panel, the eclipse in the light intercepting portion of the liquid crystal panel likewise becomes great and therefore, the illuminating efficiency becomes reduced.

The second optical systems can be comprised of a positive cylindrical lens 21 having positive refractive power in the direction of arrangement of the plurality of light sources, and a negative cylindrical lens 22 having negative refractive power in the direction of arrangement of the plurality of light sources, the positive cylindrical lens 21 and the negative cylindrical lens 22 being arranged in succession from the light source side.

It is preferable that the positive cylindrical lens be stronger in the refractive power of the light source side lens surface thereof than in that of the other lens surface thereof, and the negative cylindrical lens be stronger in the refractive power of the lens surface thereof adjacent to the third optical system 3 than in that of the other lens surface thereof.

Further, it is preferable that the following conditional expression be satisfied:

$$0.5 < -fs2/fs1 < 0.9, \quad (2)$$

where fs1 is the focal length of the positive cylindrical lens in the direction of arrangement of the plurality of light sources, and fs2 is the focal length of the negative cylindrical lens in the direction of arrangement of the plurality of light sources.

This conditional expression (2) limits the ratio between the focal length of the positive cylindrical lens in the direction of arrangement of the plurality of light sources and the focal length of the negative cylindrical lens in the direction of arrangement of the plurality of light sources. In the area less than the lower limit value of conditional expression (2), the light beam compression rate of the pair of cylindrical lens becomes two high and the light beam diameter becomes small, but the degree of parallelism of the light beam becomes two bad and in the second lens array, the light beam enters the neighboring frame and the illuminating efficiency is reduced. On the other hand, in the area exceeding the upper limit value of conditional expression (2), the light beam compression rate is too weak and the light beam diameter does not become sufficiently small and the eclipse occurs in the first lens array and therefore, the illuminating efficiency becomes reduced.

Further, there is a form in which between adjacent ones of the plurality of light sources, there is disposed such a condensing element that the adjacent light sources become conjugate with each other.

FIGS. 1A and 1B are optical cross-sectional views of a first embodiment of the projection type display apparatus of the present invention. FIG. 1A is a top plan view (a cross-section in the long side direction of a liquid crystal panel), and FIG. 1B is a side view (a cross-section in the short side direction of the liquid crystal panel). In the following description, it is assumed that the size of the light-emitting portion of a light source (light-emitting tube) is of the order of 1.5 mm.

White light emitted from the light-emitting portion 1Uc of a first light-emitting tube 1U (light source) is converted into a substantially parallel light by a parabolic mirror 2U, an likewise white light emitted from the light-emitting portion 1Lc of a second light-emitting tube 1L (light source) is converted into a substantially parallel light by a parabolic mirror 2L. The light-emitting tubes 1U and 1L are disposed while being deviated toward the optical axis AA of an illuminating optical system relative to the centers of openings in the respective parabolic mirrors 2U and 2L.

Light beam emitted from the two parabolic mirrors 2U and 2L have their beam diameters compressed only in the direction of arrangement of the light-emitting tubes 1U and 1L by a positive cylindrical lens 21 having positive refractive power only in the direction of arrangement of the light-emitting tubes 1U and 1L and a negative cylindrical lens 22 having negative refractive power only in the direction of arrangement of the light-emitting tubes 1U and 1L. As shown in FIG. 1, the positive cylindrical lens 21 may preferably have the refractive power of its lens surface adjacent to the light sources 1U, 1L made stronger than the refractive power of the other lens surface thereof adjacent to the lens 22 in order to dispose the sharing of refraction to the both surfaces and reduce aberrations. Likewise, the negative cylindrical lens 22 may preferably have the refractive power of its lens surface adjacent to a first lens array 3 made stronger than the refractive power of the other lens surface thereof adjacent to the lens 21 in order to disperse the sharing of refraction to the both surfaces and reduce aberrations.

Next, by the first lens array 3, the light source images of the light-emitting tubes 1U and 1L are formed in each frame (small lens element) of a second lens array 4. The foal lengths of the first lens array 3 and the second lens array 4 are substantially equal to each other, and the interval between the first lens array 3 and the second lens array 4 is an interval substantially equal to said focal lengths. The light beam condensed by the first lens array is separated into P wave and S wave by each polarization separating layer 5B of a polarization converting element 5, and the P wave is transmitted through the polarization separating layer 5B and the S wave is reflected by the polarization separating layer 5B, and the P wave is phase-converted by each $\lambda/2$ phase difference plate 5A and has its direction of polarization rotated by 90° and uniformized to that of the S wave. Thereby all the light beams emitted from the polarization converting element 5 become linearly polarized lights polarized in the same direction. These polarized lights enter a dichroic mirror which will be described later as S polarized light. The reference character 5C designates a bamboo-blind-like light intercepting plate. The light beam emitted from the polarization converting element 5 is condensed by a first condenser lens 6, and is superposed on the display portions 8R, 8G and 8B of an image forming apparatus comprising a liquid crystal panel by which the light is modulated for the colors of R, G and B and an image is formed. That is, of the light beam emerging from the first condenser lens 6, red light is reflected by a dichroic mirror DM1 and the remaining green light and blue light are transmitted therethrough. The red light reflected by the dichroic mirror DM1 is directed to the display portion 8R of an image forming apparatus for red through the intermediary of a reflecting mirror M1 and a second condenser lens 7R. The light transmitted through the dichroic mirror DM1 is separated into green and blue by a dichroic mirror DM2, and the green light is reflected by the dichroic mirror DM2 and is directed to the display portion 8G of an image forming apparatus for green through a second condenser lens 7G. The blue light transmitted through the dichroic mirror DM2 is condensed by a third condenser lens 11, is reflected by a reflecting mirror M2, and is directed to the display portion 8B of an image forming apparatus for blue by a relay lens 12 through the intermediate of a reflecting mirror M3 and a second condenser lens 7B. The reference character P1 designates an incidence side polarizing plate, the reference character P2 denotes an emergence side polarizing plate, and the display portions 8R, 8G and 8B are the main body of the liquid crystal panel.

The second condenser lenses 7R, 7G and 7B are for condensing the light beam emerging from the first condenser lens 6 onto the entrance pupil of a projection lens 10. A cross dichroic prism 9 is disposed between the display portions 8R, 8G, 8B of the respective image forming apparatuses and the projection lens 10 to effect the color combination of R, G and B image lights. The projection lens 10 is designed to be telecentric relative to the display portions 8R, 8G and 8B of the image forming apparatuses, and is constructed such that the angle of incidence of each image light onto the dichroic film surface of the cross dichroic prism 9 becomes constant everywhere on the dichroic film, and is of a construction in which color irregularity by any change in the angle of incidence onto the dichroic film does not occur. The light beams modulated by the display portions 8R, 8G and 8B of the image forming apparatuses are color-combined by the cross dichroic prism 9, and are enlarged and projected onto a screen, not shown, by the projection lens 10. The construction and disposition of the polarization converting element are not restricted to those shown herein, but may also be those shown in the aforementioned Japanese Laid-Open Patent Application No. 6-265887.

In the embodiment of FIG. 1, the two light sources 1U and 1L and two parabolic mirrors 2U and 2L are disposed eccentrically toward the optical axis AA of the illuminating optical system and the beam diameter in the direction of arrangement is compressed by the pair of cylindrical lens 21 and 22 and the beam is directed to the first lens array 3, whereby in spite of the two light sources being used, it becomes possible to distribute the portion of high illuminance on the emergence surface of the second lens array 4 near the optical axis of the illuminating optical system, and an improvement in the illuminating efficiency when the two light sources are used is realized. In the embodiment of FIG. 1, the polarization converting element 5 is used and therefore, the width 4H of a frame of the second lens array 4 in the short side direction thereof is greater than the interval between the light intercepting plates 5C of the polarization converting element 5, i.e., the opening width 5D and thus, the direction of arrangement of the two light sources is the short side direction of the respective frames of the first and second lens arrays and the liquid crystal panels 8R, 8G and 8B. In the present embodiment, the ratio between the length and width of the liquid crystal panels 8R, 8G and 8B is set to 3:4 and therefore, the ratio between the length and width of a frame of the first lens array 3 and of the second lens array 4 (4H:4W) is also nearly 3:4 and as the result, 5D:4H=2:3.

When the polarization converting element 5 of the projection type display apparatus of FIG. 1 is omitted, the width 4W of a frame of the second lens array 4 in the long side direction thereof is greater than the width 4H of a frame in the short side direction thereof (4W:4H=4:3) and therefore, if the direction of arrangement of the two light sources is the long side direction of the liquid crystal panels 8R, 8G and 8B, it will more increase the illuminating efficiency.

The reason why the construction as described above is advantageous in respect of the illuminating efficiency is that since the degree of parallelism in the direction for compressing the light beam is aggravated, it is better to select a direction for compressing the light beam in which the tolerance to the degree of parallelism of the light beam is greater. Accordingly, considering with the polarization converting element 5 as the reference, the direction for compressing the light beam, i.e., the direction of arrangement of the plurality of light sources, is adopted in a direction orthogonal to an incidence plane with respect to the polarization dividing layer (dividing surface) of the element 5. The incidence plane is a plane containing the optical axis AA or an axis parallel thereto and a perpendicular to the dividing layer.

Further, by disposing a Fresnel lens 28 of positive refractive power in the boundary portion between the two parabolic mirrors 2U and 2L, the two light sources can be conjugate with each other as indicated by dotted line, whereby the loss of light can be further decreased and the illuminating efficiency can be more improved.

Also, the parabolic mirrors 2U and 2L can be replaced with an elliptical mirror and a concave lens to thereby obtain a similar effect.

Also, the positive cylindrical lens 21 and the negative cylindrical lens 22 may be formed by toric lenses or free curved surface lenses having refractive power also in a direction perpendicular to the direction of arrangement of the light sources, and if the light beam compressing action in the direction of arrangement of the light sources is greater than that in a direction perpendicular thereto, good illuminating efficiency will be obtained.

[Numerical Value Embodiments]

Numerical value embodiments in the construction of FIG. 1 are shown in Table 1 below.

In Table 1, R1 represents the radius of curvature of the light source side of the cylindrical lens in the direction of arrangement of the light sources, R2 represents the radius of curvature of the first lens array side of the cylindrical lens in the direction of arrangement of the light sources, D represents the center thickness of the cylindrical lens, N represents the refractive index of the cylindrical lens in d-line, and DD represents the interval between the positive cylindrical lens and the negative cylindrical lens.

power only in the short side direction of liquid crystal panels 8R, 8G and 8B which is the direction of arrangement thereof, and having the prism effect of deflecting the optical axes AU and AL of the parabolic mirrors toward the optical axis AA of the illuminating system, and an optical element 24 making the optical axes AU and AL of the parabolic mirrors deflected by the optical element 23 parallel to the optical axis AA of the illuminating system, and having negative refractive power only in the short side direction of the liquid crystal panels 8R, 8G and 8B. Two effects, i.e., the effect of narrowing the optical axis interval of the parabolic mirrors and the effect of compressing the diameter of the light beam, are realized by the optical elements 23 and 24. According to the present embodiment, high illuminating efficiency can be realized even by the use of an ordinary reflecting mirrors.

FIGS. 3A and 3B are optical cross-sectional views of a third embodiment of the present invention.

FIGS. 3A and 3B show the embodiment of the present invention realized by the use of an ordinary reflecting mirror of which the center of opening and the optical axis coincide with each other. A light source portion is constituted by two light-emitting tubes 1U and 1L, two parabolic mirrors 2U and 2L, a positive cylindrical lens 21 having positive refractive power only in the short side direction of liquid crystal panels which is the direction of arrangement thereof, a negative cylindrical lens 22 having negative refractive power only in the short side direction, and a prism 25 having the refracting action in said direction of arrangement. The optical axes AU and AL of the two parabolic mirrors are disposed inwardly relative to the optical axis AA of the illuminating system, and by the prism 25 for making the two optical axes AU and AL parallel to the optical axis AA of the illuminating system, the portions of high illuminance of the parabolic mirrors are distributed near the optical axis of the illuminating system to thereby realize high illuminating efficiency. The operation of the positive cylindrical lens 21 and subsequent elements is similar to that in the embodiment of FIG. 1.

TABLE 1

|  | Numerical Value Embodiment 1 | Numerical Value Embodiment 2 | Numerical Value Embodiment 3 |
| --- | --- | --- | --- |
| focal length fp of parabolic mirror | 7 mm | 8 mm | 6 mm |
| otptical axis interval DL of parabolic mirror | 30 mm | 30 mm | 30 mm |
| positive cylincrical lens |  |  |  |
| R1 | 100 mm | 100 mm | 100 mm |
| R2 | ∞ | ∞ | ∞ |
| D | 15 mm | 15 mm | 15 mm |
| N | 1.51633 | 1.51633 | 1.51633 |
| negative cylindrical lens |  |  |  |
| R1 | ∞ | ∞ | ∞ |
| R2 | 75 mm | 70 mm | 80 mm |
| D | 2 mm | 2 mm | 2 mm |
| N | 1.51633 | 1.51633 | 1.51633 |
| conditional expression (1) | 4.286 | 3.75 | 5 |
| conditional expression (2) | 0.75 | 0.7 | 0.8 |

FIGS. 2A and 2B are optical cross-sectional views of a second embodiment of the present invention.

FIGS. 2A and 2B show the embodiment of the present invention realized by the use of an ordinary reflecting mirror of which the center of opening and the optical axis coincide with each other. A light source portion is constituted by two light-emitting tubes 1U and 1L, two parabolic mirrors 2U and 2L, an optical element 23 having positive refractive FIGS. 4A and 4B are a top plan view (cross-section in the long side direction of liquid crystal panels) and a side view (cross-section in the short side direction of liquid crystal panels), respectively, of a fourth embodiment of the present invention.

FIGS. 4A and 4B show the embodiment of the present invention realized by the use of ordinary reflecting mirrors of which the centers of openings and the optical axes coincide with each other. Among two light-emitting tubes 1U, 1L and two parabolic mirrors 2U, 2L disposed so as to be opposed to each other in the short side direction of liquid crystal panels with respect to the optical axis AA of the illuminating system and a positive cylindrical lens 21, reflecting mirrors 26 and 27 are disposed so as to be orthogonal to each other and the portions of high illuminance of the parabolic mirrors are distributed near the optical axis AA of the illuminating optical system to thereby realize high illuminating efficiency. The operation of the positive cylindrical lens 21 and subsequent elements is similar to that in the embodiment of FIG. 1.

Figures 5A, 5B:
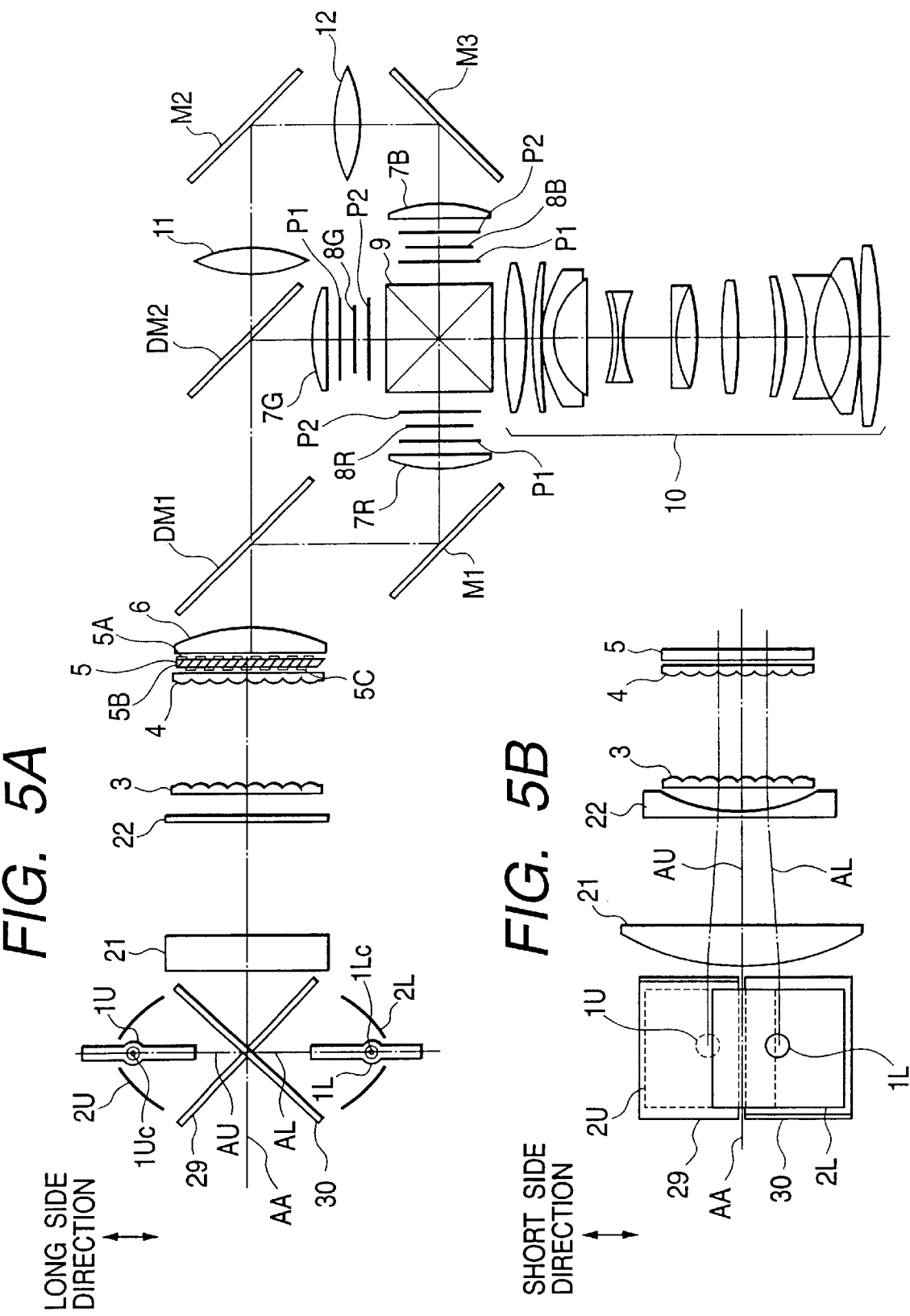
FIGS. 5A and 5B are a top plan view and a side view, respectively, of a projection type display apparatus according to a fifth embodiment of the present invention.
Figure 6:
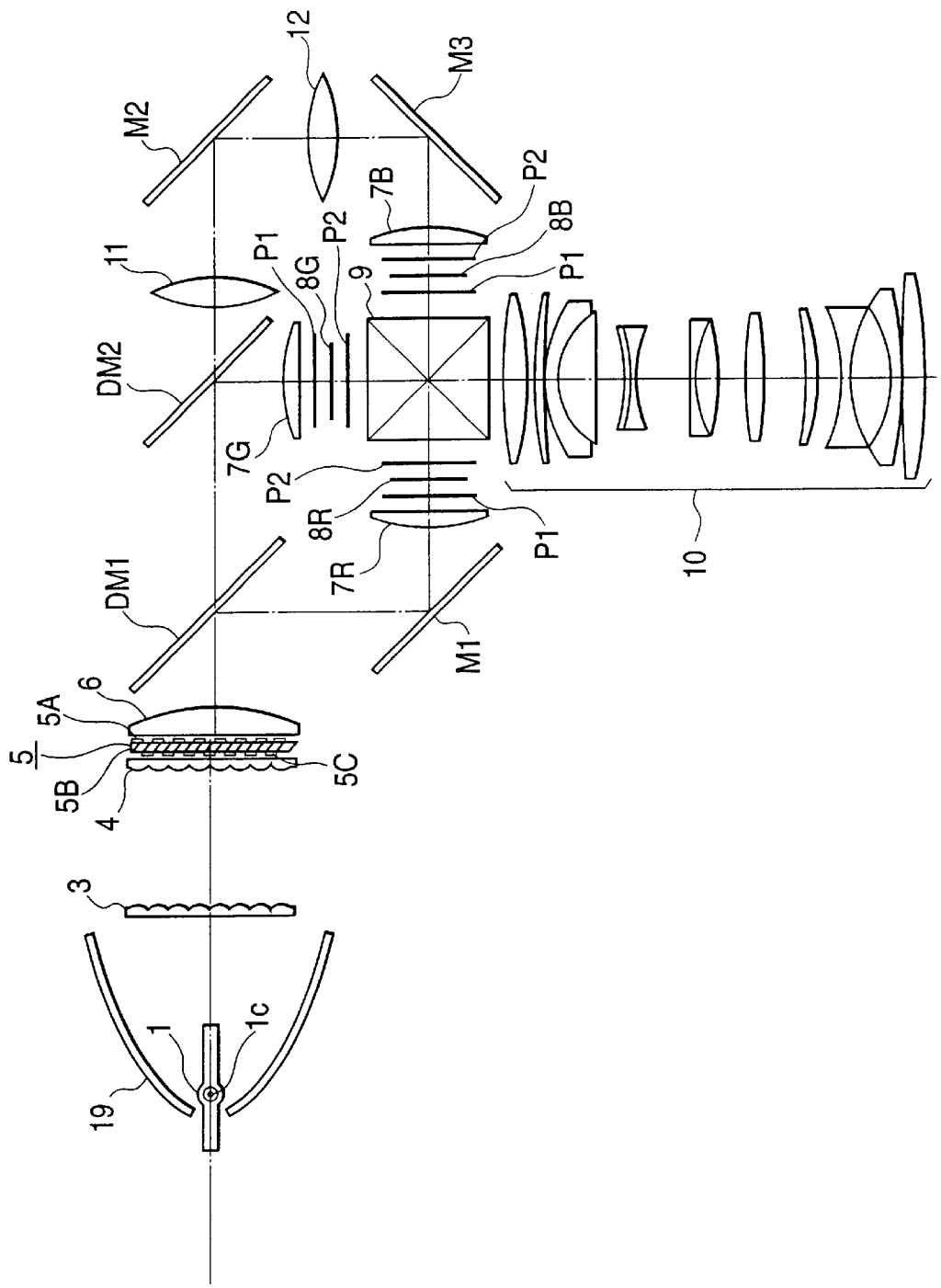
FIG. 6 is an optical cross-sectional view of a projection type display apparatus according to the prior art.

FIGS. 5A and 5B are a top plan view (cross-section in the long side direction of liquid crystal panels) and a side view (cross-section in the short side direction of liquid crystal panels), respectively, of a fifth embodiment of the present invention.

FIGS. 5A and 5B show the embodiment of the present invention realized by the use of ordinary reflecting mirrors of which the centers of openings and the optical axes coincide with each other. Among two light-emitting tubes 1U, 1L and two parabolic mirrors 2U, 2L disposed so as to be opposed to each other with their optical axes deviated in the short side direction with respect to the optical axis AA of the illuminating system and a positive cylindrical lens 21, reflecting mirrors 29 and 30 are disposed so as to be orthogonal to each other and the portions of high illuminance of the parabolic mirrors are distributed near the optical axis AA of the illuminating optical system to thereby realize high illuminating efficiency. Also, by adopting the above-described construction, the present embodiment realizes the downsizing of the liquid crystal panels in the long side direction thereof. The operation of the positive cylindrical lens 21 and subsequent elements is similar to that in the embodiment of FIGS. 1A and 1B.

As described above, in the illuminating device of the present invention, an improvement in the illuminating efficiency when a plurality of light sources are used can be realized. The present invention is suitable for a case where a very bright screen image is required in a projection type display apparatus such as a liquid crystal projector.

What is claimed is:

1. An illuminating device comprising:
   a first optical system which makes light beams emitted from a plurality of light sources aligned along a first direction substantially parallel;
   a second optical system in which a power that compresses the light beams from said light sources in the first direction is larger than a power that compresses the light beams from said light sources in a second direction perpendicular to the first direction; and
   a third optical system having a plurality of rectangular micro lenses which are two-dimensionally arranged, wherein the longer side of said micro lens is parallel to said first direction.

2. An illuminating device comprising:
   a first optical system which makes light beams emitted from a plurality of light sources aligned along a first direction substantially parallel;
   a polarization converting element which makes polarization directions of the light beams from said first optical system uniform, said polarization converting element having a striped pattern like light interception portions which are arranged along a second direction perpendicular to the first direction; and
   a second optical system in which a power that compresses the light beams from said light sources in the first direction is larger than a power that compresses the light beams from said light sources in the second direction, said second optical system being provided between said light sources and said polarization converting element.

3. A projection type display apparatus including an illuminating device according to claim 1 or claim 2, for illuminating an image forming element.

4. An illuminating device comprising:
   a first optical system which makes light beams emitted from a plurality of light sources so arranged as to be greater in the number of light sources in a first direction than in a second direction perpendicular to the first direction substantially parallel; and
   a second optical system in which a power that compresses the light beams from said light sources in the first direction is larger than a power that compresses the light beams from said light sources in the second direction.

5. An illuminating device according to claim 4 further comprising a third optical system having a plurality of rectangular micro lenses which are two-dimensionally arranged, wherein the longer side of said micro lens extends in said first direction.

6. An illuminating device according to claim 5 further comprising a fourth optical system having a plurality of rectangular micro lenses which are two-dimensionally arranged, wherein the longer side of said micro lens of said fourth optical system extends in said first direction.

7. An illuminating device according to claim 6, wherein said first optical systems, said second optical system, said third optical system and said fourth optical system are provided in sequence from said light source side.

8. An illuminating device according to claim 4, wherein said plurality of light sources are aligned along said first direction.

9. An illuminating device according to claim 4 further comprising an optical element which is disposed between two adjacent light sources of said plurality of light sources for making said two adjacent light sources conjugate from each other.

10. An illuminating device according to claim 9, wherein said optical element has a positive refractive power.

11. An illuminating device according to claim 10, wherein said optical element is a Fresnel lens.

12. An illuminating device according to claim 4, wherein said first optical system has a plurality of rotational ellipsoidal mirrors, and a part of contact points of adjacent rotational ellipsoidal mirrors of the plurality of rotational ellipsoidal mirrors is cutout.

13. An illuminating device according to claim 4 further comprising a polarization converting element which makes polarization directions of the light beams from said light sources uniform.

14. An illuminating device according to claim 13, wherein said polarization converting element has striped pattern like light intercepting portions.

15. An illuminating device according to claim 14, wherein said striped pattern like light intercepting portions are arranged along a second direction perpindicular to the first direction.

16. An illuminating device according to claim 4 further comprising a third optical system having a plurality of rectangular micro lenses which are two-dimensionally arranged, and the shorter side of said micro lens extends in said first direction.

17. An illuminating device according to claim 16 further comprising a fourth optical system having a plurality of rectangular micro lenses which are two-dimensionally arranged, wherein the shorter side of said micro lens extends in said first direction.

18. An illuminating device according to claim 17, wherein said first, second, third and fourth optical systems are provided in sequence from the light source side.

19. An illuminating device according to claim 16 further comprising a polarization converting element having striped pattern like light intercepting portions which are arranged to be parallel along said first direction.

20. An illuminating device according to claim 17 further comprising a polarization converting element having striped pattern like light intercepting portions which are arranged to be parallel along said first direction.

21. An illuminating device according to claim 18 further comprising a polarization converting element having striped pattern like light intercepting portions which are arranged to parallel along said first direction.

22. An illuminating device according to claim 4, wherein said first optical system has a plurality of rotational parabolic mirrors and at least one of a prism and a plane mirror.

23. An illuminating device according to claim 4, wherein said first optical system has a plurality of rotation parabolic mirrors and the optical axes of said plurality of parabolic mirrors are substantially parallel to each other.

24. An illuminating device according to claim 4, wherein said first optical system has a plurality of rotational parabolic mirrors corresponding to the respective plurality of light sources, and the following condition is satisfied:

$$3 < DL/fp < 6,$$

where DL is an interval between adjacent two light sources of said plurality of light sources, and fp is the focal length of said parabolic mirrors.

25. An illuminating device according to claim 4, wherein said optical system comprises, in sequence from the light source side, a positive cylindrical lens having a positive refractive power with respect to said first direction and a negative cylindrical lens having a negative refractive power with respect to said first direction.

26. An illuminating device according to claim 25, wherein a refractive power of a surface of said positive cylindrical lens at the light source side is greater than that of the other surface thereof, and a refractive power of a surface of said negative cylindrical lens at the light source side is smaller than that of the other surface thereof.

27. An illuminating device according to claim 26, wherein a surface of said positive cylindrical lens at the light source side has a refractive power and the other surface thereof is substantially flat, and a surface of said negative cylindrical lens at the light source side is substantially flat and the other source of said negative cylindrical lens has a refractive power.

28. An illuminating device according to claim 25, wherein the following condition is satisfied:

$$0.5 - fs2/fs1, 0.9,$$

where fs1 is the focal length of said positive cylindrical lens in the first direction, and fs2 is the focal length of said negative cylindrical lens in the first direction.

29. An illuminating device according to claim 6, wherein said second optical system does not have an action to compress the light beams with respect to said second direction.

30. An illuminating device comprising:
   a first optical system which makes light beams emitted from a plurality of light sources so arranged as to be greater in the number of light sources in a first direction than in a second direction perpendicular to the first direction substantially parallel;
   a second optical system in which a power that compresses the light beams from said light sources in the first direction is larger than a power that compresses the light beams from said light sources in the second direction;
   a third optical system having a plurality of rectangular micro lenses which are two-dimensionally arranged, the longer side of said micro lens extending in the first direction; and
   a fourth optical system having a plurality of rectangular micro lenses which are two-dimensionally arranged, the longer side of said micro lens extending in the first direction.

31. An illuminating device according to claim 30, wherein said first optical system, said second optical system, said third optical system and said fourth optical system are disposed in the named order from the light source side.

32. An illuminating device comprising:
   a first optical system which makes light emitted beams from a plurality of light sources so arranged as to be greater in the number of light sources in a first direction than in a second direction perpendicular to the first direction substantially parallel;
   a second optical system in which a power that compresses the light beams from said light sources in the first direction is larger than a power that compresses the light beams from said light sources in the second direction;
   a third optical system having a plurality of rectangular micro lenses which are two-dimensionally arranged, the longer side of said micro lens extending in the second direction; and
   a fourth optical system having a plurality of rectangular micro lenses which are two-dimensionally arranged, the longer side of said micro lens extending in the second direction, and
   a polarization converting element which makes polarization directions of the light beams from said light sources uniform, said polarization converting element having striped pattern like light intercepting portions which are arranged along the second direction.

33. An illuminating device according to claim 32, wherein said first optical system, said second optical system, said third optical system, said fourth optical system, and said polarization converting element are disposed in the named order from the light source side.

34. A projection type display apparatus comprising:
   an illuminating device according to claim 4; and
   at least one image forming element which is illuminated by said illuminating device.

35. An apparatus according to claim 34, further comprising a projection optical system for projecting an image formed by said image forming element onto a surface to be projected.

36. A projection type display apparatus comprising:
   an illuminating device according to claim 30; and
   at least one image forming element which is illuminated by said illuminating device.

37. An apparatus according to claim 36 further comprising a projection optical system for projecting an image formed by said image forming element onto a surface to be projected.

38. A projection type display apparatus comprising: an illuminating device according to claim 31; and at least one image forming element which is illuminated by said illuminating device.

39. An apparatus according to claim 38 further comprising a projection optical system for projecting an image formed by said image forming element onto a surface to be projected.

40. An illuminating device comprising:

a first optical system which converts light beams emitted from a plurality of light sources into substantially parallel beams;

a second optical system by which the parallel light beams from said first optical system are compressed with respect to at least one direction to emerge therefrom as parallel beams;

a third optical system which receives the light beams from said second optical system to form a plurality of images of light sources, said third optical system having a plurality of micro lenses which are two-dimensionally arranged;

a fourth optical system disposed at a position of the light source images formed by said third optical system or in the vicinity of the light source images, said fourth optical system having a plurality of micro lenses which are two-dimensionally arranged; and a polarization converting element which makes polarization directions of the light beams from said fourth optical system substantially uniform, said polarization converting element having striped pattern like light intercepting portions.

41. A projection type display apparatus comprising:

an illuminating device according to claim 44; and at least one image forming element which is illuminated by said illuminating device.

42. An apparatus according to claim 45 further comprising a projection optical system for projecting an image formed by said image forming element onto a surface to be projected.

* * * * *

UNITED STATES PATENT AND TRADEMARK OFFICE
CERTIFICATE OF CORRECTION

PATENT NO. : 6,431,727 B1
DATED : August 13, 2002
INVENTOR(S) : Saburo Sugawara et al.

It is certified that error appears in the above-identified patent and that said Letters Patent is hereby corrected as shown below:

Column 4,
Line 22, "$3<DL/Fp<6$," should read -- $3<DL/fp<6$, --

Column 13,
Line 61, Claim 29 should recite dependency from Claim 4.

Column 14,
Line 23, Claim 32, "makes light emitted beams" should read -- makes light beams emitted --

Column 15,
Line 2, Claim 38 should recite dependency from Claim 32.

Column 16,
Line 13, Claim 41 should recite dependency from Claim 40.
Line 16, Claim 42 should recite dependency from Claim 41.

Signed and Sealed this

Fifteenth Day of April, 2003

JAMES E. ROGAN
*Director of the United States Patent and Trademark Office*